C. H. THOMPSON.
Die for Welding Cultivator-Axles.
No. 164,610. Patented June 15, 1875.
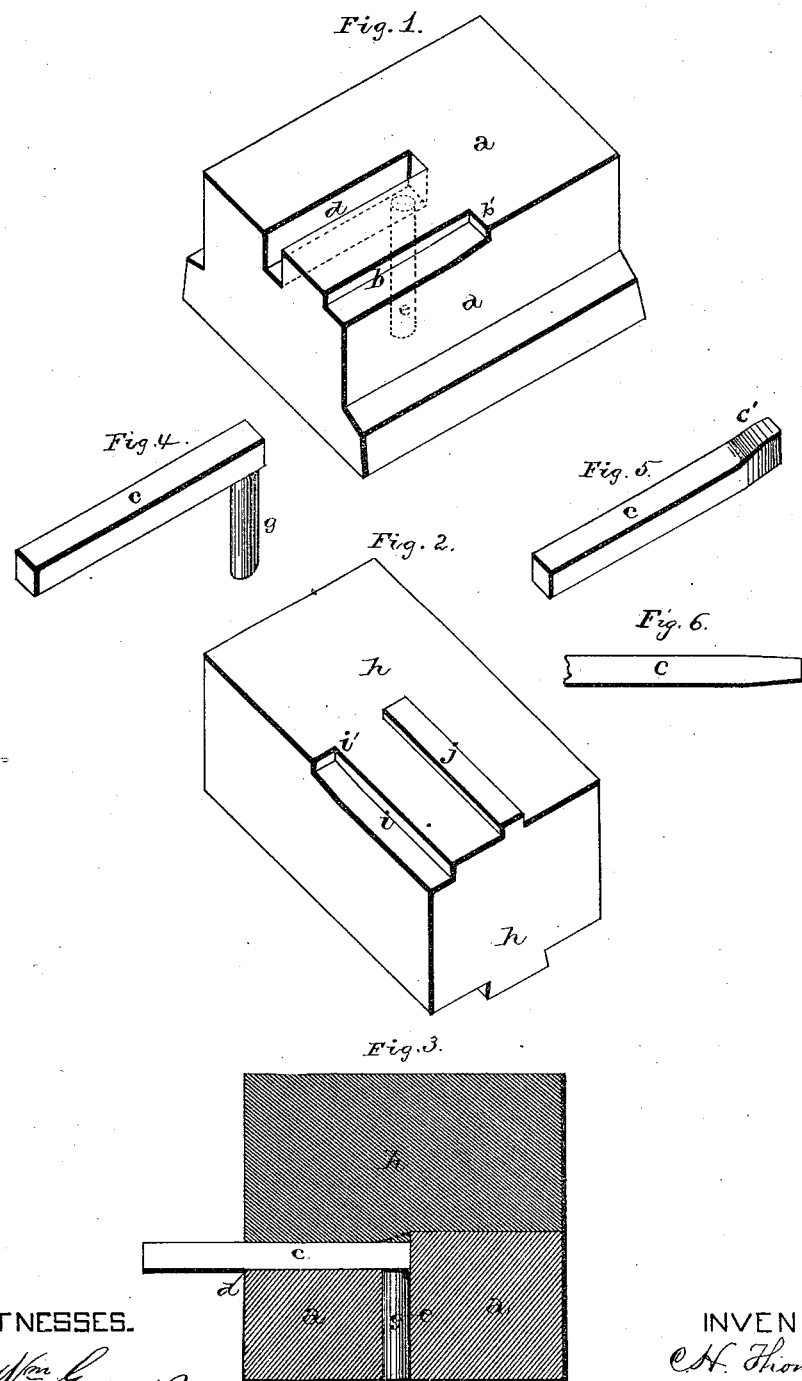
WITNESSES.
INVENTOR.

UNITED STATES PATENT OFFICE.

CHARLES H. THOMPSON, OF CHICAGO, ILLINOIS.

IMPROVEMENT IN DIES FOR WELDING CULTIVATOR-AXLES.

Specification forming part of Letters Patent No. 164,610, dated June 15, 1875; application filed May 14, 1875.

*To all whom it may concern:*

Be it known that I, CHARLES H. THOMPSON, of the city of Chicago, in the county of Cook and State of Illinois, have invented certain new and useful Improvements in Dies for Welding Axles; and I do hereby declare the following to be a full, clear, and exact description of the invention, such as will enable others skilled in the art to which it pertains to make and use it, reference being had to the accompanying drawings, which form part of this specification.

My invention relates to an improved die for welding cultivator-axles; and it consists in the peculiar construction of the dies, whereby the square bar has first its end swaged and increased in depth, and is then welded to another placed at right angles to it, as will be more fully described hereafter.

Figure 1 is a perspective of the female die, and Fig. 2 a similar view of the male die. Fig. 3 is a vertical section of the whole die, and Figs. 4, 5, and 6 views of the axle.

$a$ represents the female die or bed-piece, which has the recess $b$ formed in its edge, in which the square bar $c$, which forms the horizontal part of the axle, is first placed after its end has been heated. This recess is slightly contracted or made shallower at its inner end $b'$, and the corresponding recess $i$ in the edge of the block $h$, which forms the upper part of the die, is similarly contracted at its end $i'$, whereby, when the die is brought down upon the heated end of the bar $c$, this end will be flattened, and a portion of the metal forced out, so as to form the raised edge $c'$ thereon. Near the center of this block $a$ is formed an elongated recess, $d$, to receive the square bar $c$ after its end has been swaged, as shown, the said recess being deeper than the thickness of the bar, so that when the bar is placed in the recess its upper side, with the exception of the swaged end, is below the level of the top of the die $a$, as shown in Fig. 3. Extending vertically down through the block $a$ from the inner end of this recess $d$, and at right angles thereto, is the round hole $e$, in which the round bar $g$ is placed after its end has been heated to a welding-heat, the swaged or thickened end of the bar $c$ resting upon the upper end of the bar $g$. On the under side of the die $h$ is formed the flange $j$, which corresponds in width, shape, and length to the recess $d$ in the block $a$, but the flange is only thick enough to just touch the straight surface of the bar $c$ as it lies in the recess; but the bar not being straight along its whole length after its end has been swaged and flattened, as the flange $j$ comes down upon the bar $c$ it encounters the swaged part, as shown by dotted lines in Fig. 3, and thus has material upon which to act, and presses this part down upon the heated end of the bar $g$.

Were it not for this swaged part the flange $j$ would simply compress the bar slightly its whole length; whereas, coming in contact with this raised part $c'$, it crushes it down, so as to weld the two heated ends together, and at the same time square the end of the bar $c$ again.

Heretofore, welding these parts of the axle together has taken a great deal of time, and can only be done by skilled blacksmiths. By means of these dies they can be rapidly stamped at a very trifling cost, and by unskilled workmen.

Having thus described my invention, I claim—

1. The blocks $a\ h$, having the recesses $b\ i\ d$, hole $e$ at right angles to the recess $d$, and flange $j$, substantially as shown and described.

2. The block $a$, having the recess $d$ and hole $e$ at right angles thereto, in combination with the block $h$, having the flange $j$, the flange serving both to weld the bars $c\ g$ together, and to straighten the upset end of the bar $c$, substantially as set forth.

In testimony that I claim the foregoing I have hereunto set my hand this 1st day of February, 1875.

C. H. THOMPSON.

Witnesses:
 C. KIMPLEN,
 E. G. SHUMWAY.